US009607776B2

(12) United States Patent
Gadkaree et al.

(10) Patent No.: US 9,607,776 B2
(45) Date of Patent: Mar. 28, 2017

(54) ULTRACAPACITOR WITH IMPROVED AGING PERFORMANCE

(71) Applicant: Corning Incorporated, Corning, NY (US)

(72) Inventors: Kishor Purushottam Gadkaree, Painted Post, NY (US); Atul Kumar, Horseheads, NY (US)

(73) Assignee: Corning Incorporated, Corning, NY (US)

(*) Notice: Subject to any disclaimer, the term of this patent is extended or adjusted under 35 U.S.C. 154(b) by 351 days.

(21) Appl. No.: 14/164,855

(22) Filed: Jan. 27, 2014

(65) Prior Publication Data

US 2015/0116905 A1   Apr. 30, 2015

Related U.S. Application Data

(60) Provisional application No. 61/895,054, filed on Oct. 24, 2013.

(51) Int. Cl.
| | |
|---|---|
| *H01G 11/26* | (2013.01) |
| *H01G 11/86* | (2013.01) |
| *H01G 11/42* | (2013.01) |
| *H01G 11/38* | (2013.01) |
| *H01G 11/34* | (2013.01) |
| *H01G 11/60* | (2013.01) |
| *H01G 11/62* | (2013.01) |
| *H01G 11/68* | (2013.01) |

(Continued)

(52) U.S. Cl.
CPC ............ *H01G 11/38* (2013.01); *H01G 11/24* (2013.01); *H01G 11/34* (2013.01); *H01G 11/60* (2013.01); *H01G 11/62* (2013.01); *H01G 11/68* (2013.01); *H01G 11/84* (2013.01); *H01G 11/26* (2013.01); *Y02E 60/13* (2013.01); *Y10T 29/417* (2015.01)

(58) Field of Classification Search
CPC ......... H01G 11/26; H01G 11/86; H01G 11/42
See application file for complete search history.

(56) References Cited

U.S. PATENT DOCUMENTS

| | | | |
|---|---|---|---|
| 5,958,214 A * | 9/1999 | Nikolskaja | G01N 27/4074 204/294 |
| 6,064,562 A | 5/2000 | Okamura | 361/502 |

(Continued)

FOREIGN PATENT DOCUMENTS

| | | |
|---|---|---|
| EP | 1959465 | 8/2008 |
| JP | 1985-211821 | 10/1985 |

(Continued)

OTHER PUBLICATIONS

M. Endo, et al., "Capacitance and Pore-Size Distribution in Aqueous and Nonaqueous Electrolytes Using Various Activated Carbon Electrodes", *Journal of Electrochemical Society*, vol. 148, No. 8, 2001, pp. A910-A914.

(Continued)

*Primary Examiner* — Nathan Milakovich
(74) *Attorney, Agent, or Firm* — John L. Haack

(57) ABSTRACT

An energy storage device such as an electric double layer capacitor has positive and negative electrodes, each including a blend of respective first and second activated carbon materials having distinct pore size distributions. The blend (mixture) of first and second activated carbon materials may be equal in each electrode.

16 Claims, 3 Drawing Sheets

(51) Int. Cl.
*H01G 11/84* (2013.01)
*H01G 11/24* (2013.01)

(56) References Cited

U.S. PATENT DOCUMENTS

| | | | |
|---|---|---|---|
| 6,353,528 B1 | 3/2002 | Hori et al. | |
| 6,865,068 B1 | 3/2005 | Murakami et al. | 361/502 |
| 7,317,607 B2 | 1/2008 | Omura et al. | 361/502 |
| 7,419,649 B2 | 9/2008 | Lundquist et al. | 423/445 |
| 7,972,535 B2 | 7/2011 | Hoshiba | 252/500 |
| 8,049,105 B2 * | 11/2011 | Kuroda | H01G 9/2031 |
| | | | 136/256 |
| 8,279,580 B2 | 10/2012 | Zhong et al. | 361/502 |
| 8,329,341 B2 * | 12/2012 | Gadkaree | C01B 31/083 |
| | | | 429/231.7 |
| 8,524,632 B2 * | 9/2013 | Gadkaree | C01B 31/08 |
| | | | 502/424 |
| 8,541,338 B2 * | 9/2013 | Gadkaree | C01B 31/10 |
| | | | 423/445 R |
| 8,576,541 B2 * | 11/2013 | Gadkaree | H01G 9/035 |
| | | | 252/62.2 |
| 9,076,591 B2 * | 7/2015 | Zheng | H01G 9/042 |
| 9,136,064 B2 * | 9/2015 | Gadkaree | H01G 11/34 |
| 2005/0014643 A1 | 1/2005 | Lini et al. | 502/432 |
| 2007/0178310 A1 * | 8/2007 | Istvan | H01M 4/583 |
| | | | 428/408 |
| 2008/0089013 A1 | 4/2008 | Zhong | C04B 35/532 |
| | | | 361/502 |
| 2008/0207442 A1 * | 8/2008 | Pfeifer | B01J 20/20 |
| | | | 502/416 |
| 2010/0296226 A1 | 11/2010 | Nanba et al. | |
| 2011/0002085 A1 | 1/2011 | Bae et al. | |
| 2011/0182000 A1 | 7/2011 | Gadkaree et al. | 361/502 |
| 2011/0228447 A1 | 9/2011 | Gadkaree et al. | 361/502 |
| 2011/0261501 A1 | 10/2011 | Gadkaree et al. | 361/502 |
| 2011/0294661 A1 * | 12/2011 | Gadkaree | C01B 31/083 |
| | | | 502/416 |
| 2012/0008253 A1 * | 1/2012 | Kuroda | H01G 9/2031 |
| | | | 361/502 |
| 2012/0177923 A1 * | 7/2012 | Kumara | C01B 31/083 |
| | | | 428/402 |
| 2012/0257326 A1 | 10/2012 | Gadkaree et al. | |
| 2012/0270102 A1 * | 10/2012 | Whitacre | H01G 11/24 |
| | | | 429/205 |
| 2013/0004841 A1 * | 1/2013 | Thompkins | H01G 11/50 |
| | | | 429/204 |
| 2013/0056138 A1 | 3/2013 | Zhong et al. | 156/242 |
| 2013/0077206 A1 | 3/2013 | Gadkaree et al. | |
| 2013/0340613 A1 * | 12/2013 | Krupnikov | B01D 53/0407 |
| | | | 95/90 |
| 2015/0030527 A1 * | 1/2015 | Gadkaree | H01G 11/34 |
| | | | 423/460 |
| 2015/0062778 A1 * | 3/2015 | Gadkaree | H01G 11/26 |
| | | | 361/502 |
| 2015/0240088 A1 * | 8/2015 | Asay | C09D 7/1291 |
| | | | 428/220 |

FOREIGN PATENT DOCUMENTS

| | | | |
|---|---|---|---|
| JP | 2007119538 A | * | 5/2007 |
| JP | 2008108979 A | * | 5/2008 |
| JP | 2009135146 A | * | 6/2009 |
| JP | 5367974 B2 | * | 12/2013 |

OTHER PUBLICATIONS

Y. Kibi, et al., "Fabrication of high-power electric double-layer capacitors", *Journal of Power Sources*, vol. 60, 1996, pp. 219-224.
PCT/US2014/061503 Search Report, mailed Mar. 10, 2015.

* cited by examiner

ULTRACAPACITOR WITH IMPROVED AGING PERFORMANCE

CROSS-REFERENCE TO RELATED APPLICATIONS

This application claims the benefit of priority under 35 U.S.C. §119 of U.S. Application Ser. No. 61/895,054 filed on Oct. 24, 2013, the entire content of which is hereby incorporated by reference.

FIELD

The present disclosure relates generally to activated carbon materials and more specifically to electric double layer capacitors comprising activated carbon-based electrodes.

SUMMARY

According to one embodiment, an electric double layer capacitor comprises a positive electrode and a negative electrode each comprising a first activated carbon material and a second activated carbon material. In embodiments, the first activated carbon material has a pore size distribution different than the second activated carbon material and each of the first activated carbon material and the second activated carbon material have <0.15 cm$^3$/g combined pore volume of any pores having a size of >2 nm.

In further embodiments, the first activated carbon material comprises pores having a size of ≤1 nm, which provide a combined pore volume of >0.3 cm$^3$/g; pores having a size from >1 nm to ≤2 nm, which provide a combined pore volume of ≥0.05 cm$^3$/g; and <0.15 cm$^3$/g combined pore volume of any pores having a size of >2 nm. The second activated carbon material comprises pores having a size of ≤1 nm, which provide a combined pore volume of ≤0.3 cm$^3$/g; pores having a size from >1 nm to ≤2 nm, which provide a combined pore volume of ≥0.05 cm$^3$/g; and <0.15 cm$^3$/g combined pore volume of any pores having a size of >2 nm.

Additional features and advantages will be set forth in the detailed description which follows, and in part will be readily apparent to those skilled in the art from that description or recognized by practicing the invention as described herein, including the detailed description and the claims.

It is to be understood that both the foregoing general description and the following detailed description present embodiments of the disclosure, and are intended to provide an overview or framework for understanding the invention as it is claimed.

The accompanying drawings are included to provide a further understanding of the disclosure, and are incorporated into and constitute a part of this specification.

DETAILED DESCRIPTION

Figure 1:
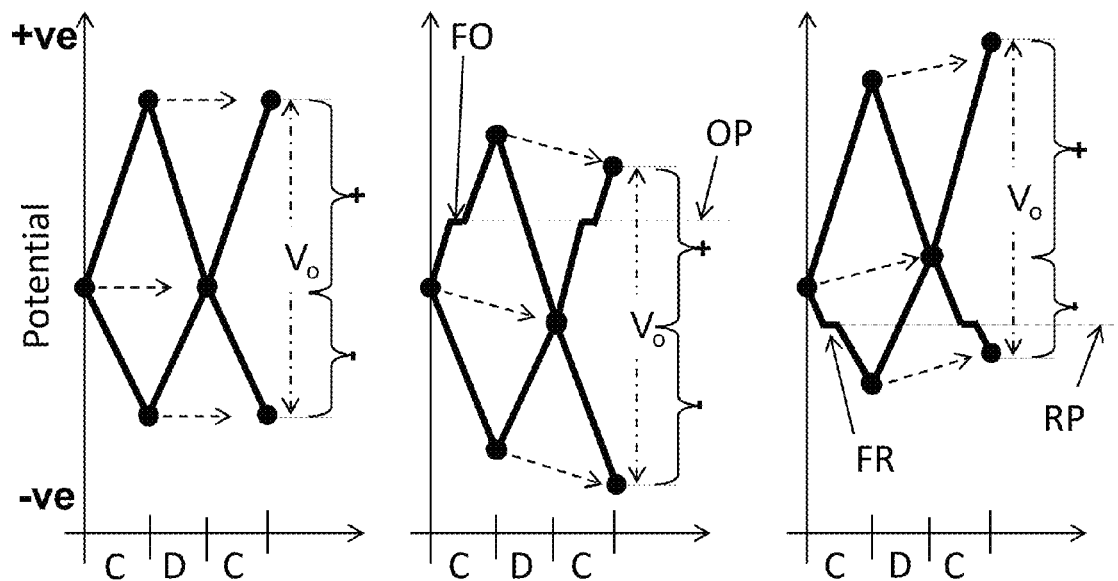
FIG. 1 is a schematic illustrating potential shifts in an EDLC due to Faradic reactions.

Reference will now be made in greater detail to various embodiments of the subject matter of the present disclosure, some embodiments of which are illustrated in the accompanying drawings. The same reference numerals will be used throughout the drawings to refer to the same or similar parts.

Energy storage devices such as ultracapacitors may be used in a variety of applications such as where a discrete power pulse is required. Example applications range from cell phones to hybrid vehicles.

Ultracapacitors typically comprise two porous electrodes that are isolated from electrical contact with each other by a porous dielectric separator. The separator and the electrodes are impregnated with an electrolytic solution, which allows ionic current to flow between the electrodes while preventing electronic current from discharging the cell. Each electrode is typically in electrical contact with a current collector. The current collector, which can comprise a sheet or plate of electrically-conductive material (e.g., aluminum) can reduce ohmic losses while providing physical support for the porous electrode material.

Energy storage is achieved by separating and storing electrical charge in the electrochemical double layers that are created at the interfaces between the electrodes and the electrolyte. Specifically, within an individual ultracapacitor cell and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential. Generally, the potential increases as a linear function of the quantity of charged species (ions and radicals) stored at or on the electrode.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices. Though it is an electrochemical device, no chemical reactions are typically involved in the energy storage mechanism. The mechanism is reversible, which allows the ultracapacitor to be charged and discharged many times.

The performance of electric double layer capacitors (EDLCs) comprising carbon-based electrodes can be intimately related to the properties of the carbon. Important characteristics of these devices are the energy density and power density that they can provide. The total available porosity and pore size distribution of the activated carbon can impact EDLC performance. Moreover, it has been commonly thought that significant quantities of mesopores are needed for electrolyte ion access to the interior surfaces of the carbon material. In this disclosure, it is demonstrated that EDLCs comprising microporous activated carbon that is tailored to the size of the respective positive and negative ions in the electrolyte exhibit a high specific capacitance (or energy density) and superior resistance to capacitive aging than EDLCs using conventional carbon-based electrodes. This advantage is attributable to the customized pore size distribution of the carbon materials.

The activated carbon materials, which form the basis of the electrodes, can be made from natural or synthetic precursor materials. Natural precursor materials include coals, nut shells, and biomass. Synthetic precursor materials typically include phenolic resins. With both natural and synthetic precursors, activated carbon can be formed by carbonizing the precursor and then activating the resulting carbon. The activation can comprise physical (e.g., steam) or chemical (e.g., KOH) activation to increase the porosity and hence the surface area of the carbon. Carbon-based electrodes can include, in addition to activated carbon, a conductive carbon such as carbon black, and a binder such as polytetrafluoroethylene (PTFE) or polyvinylidene fluoride (PVDF). The activated carbon-containing layer (carbon mat) is typically laminated over a current collector to form the carbon-based electrode.

The choice of electrode materials directly affects the performance of the device, including the achievable energy density and power density. The energy density (E) of an EDLC is given by $E=\frac{1}{2} CV^2$, and the power density (P) of an EDCL is given by $P=V^2/R$, where C is the capacitance, V is the device's operating voltage, and R is the equivalent series resistance (ESR) of the device.

In relation to the capacitance, a beneficial attribute is the ability to maintain (or not significantly lose) capacitance over time as a result of multiple charge-discharge cycles that accumulate with use. Aging of the carbon materials, such as by radical or ion trapping, can reduce the useful life of ultracapacitors comprising activated carbon-based electrodes.

Accordingly, it would be an advantage to provide activated carbon materials and device architectures comprising activated carbon materials as well as methods for making activated carbon materials having a high specific capacitance that are resistant to aging. Such materials can be used to form carbon-based electrodes that enable efficient, long-life and high energy density devices.

Recently, with a goal of increasing the energy density and power density of EDLC devices, engineered carbon materials have been developed to achieve higher capacitance. To achieve higher capacitance, activated carbon materials with high surface area (500-2500 $m^2/g$) may be used.

A further approach to increasing the energy density and power density is to increase the capacitor's operating voltage. In this regard, aqueous electrolytes have been used in EDLCs for lower voltage (<1V) operation, while organic electrolytes have been used for higher voltage (2.3-2.7 V) devices. However, to achieve even higher energy densities, there is a need to increase the voltage envelop from conventional values of about 2.7 V to around 3.0 V. Such an increase from 2.7 to 3.0 V will result in a 23% increase in the energy density.

Operation at higher voltages subjects the EDLC components to several different types of stresses that may lead to faster deterioration of the device. Such stresses include, for example, mechanical stresses on the electrodes due to movement of charged ions back-and-forth into the pores of the activated carbon, and chemical stresses due to generation of by-product gases as well as chemical degradation. The chemical stresses are in most part due to Faradic charge transfer processes in the cell.

Insomuch as higher energy densities and higher power densities may be pursued in next generation EDLCs via operation at high applied voltages, it will be desirable to provide activated carbon to minimize unwanted Faradaic reactions, particularly at the higher potentials. Such devices may be achieved in accordance with various embodiments by engineering the pore size distribution and impurity content of the activated carbon used to form the electrodes.

These Faradic charge transfer processes manifest as oxidation and reduction reactions at each of the positive and negative electrode of the EDLC. Such irreversible Faradic charge transfer processes may cause the potential of the electrodes to shift unfavorably. This is shown schematically in FIG. 1, which illustrates the potential response through successive charge (C) and discharge (D) cycles for three different examples. In the left-most pane, there are no Faradic reactions. In the middle pane, which corresponds to Faradic oxidation (FO) reactions at the positive electrode, the potential of the positive electrode will shift at the oxidation potential (OP) resulting in a net negative potential shift of the positive electrode as well as a net negative shift of the negative electrode (illustrated by the single-headed arrows) toward the reduction limit of the of the electrolyte potential window. In a similar vein, in the right-hand pane, Faradic reduction (FR) at the negative electrode is illustrated at the reduction potential (RP), which causes a net positive potential shift in the electrodes, including a shift of the positive electrode toward the oxidation limit of the electrolyte potential window. Either of these oxidation or reduction mechanisms can adversely affect the performance of an associated device.

Figure 2:
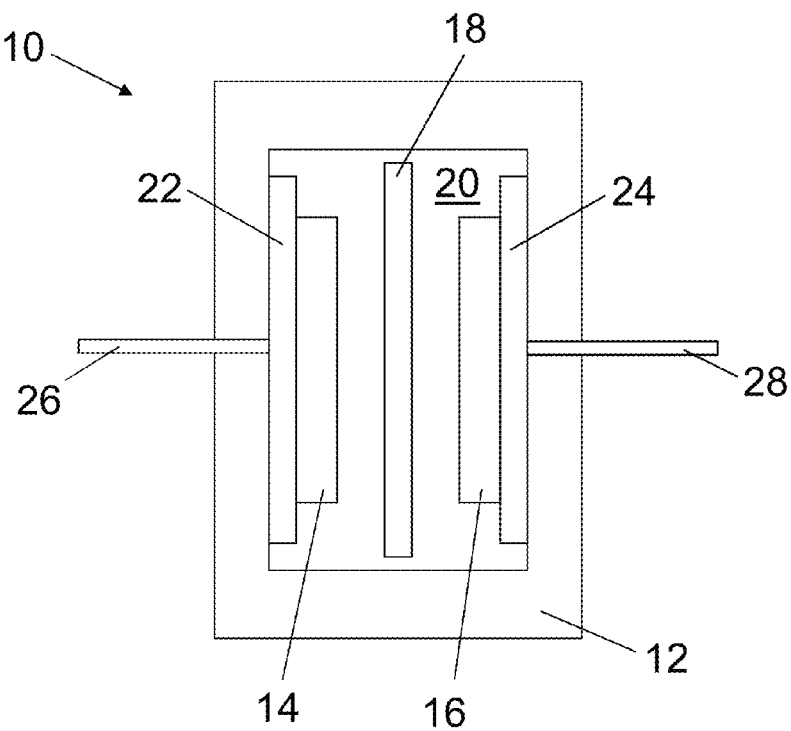
FIG. 2 is a schematic illustration of an example ultracapacitor.

The surface area, surface functional groups and the porosity and pore size distribution of the activated carbon can affect the performance of the cell. FIG. 2 is a schematic illustration of an example ultracapacitor 10, which includes the blended electrode architecture disclosed herein. Ultracapacitor 10 includes an enclosing body 12, a pair of current collectors 22, 24, a first carbon mat 14 and a second carbon mat 16 each formed over one of the current collectors, and a porous separator layer 18. Electrical leads 26, 28 can be connected to respective current collectors 22, 24 to provide electrical contact to an external device. Carbon mats 14, 16 each comprise a mixture of at least two porous activated carbon materials as disclosed herein. A liquid electrolyte 20 is contained within the enclosing body 12 and incorporated throughout the porosity of both the porous separator layer and each of the porous electrodes. In embodiments, individual ultracapacitor cells can be stacked (e.g., in series) to increase the overall operating voltage. Ultracapacitors can have a jelly roll design, prismatic design, honeycomb design, or other suitable configuration.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the electrodes from each other while allowing ion diffusion. The porous separator can be made of a dielectric material such as cellulosic materials, glass, and inorganic or organic polymers such as polypropylene, polyesters or polyolefins. In embodiments, a separator layer thickness can range from about 0.5 mil to 10 mils.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. Patent Application Publication Nos. 2013/0075647, 2013/0207019 and U.S. patent application Ser. No. 13/909,645, the disclosures of which are incorporated herein by reference. An example quaternary ammonium salt is tetraethylammonium tetraflouroborate ((Et)$_4$NBF$_4$).

Example solvents for the electrolyte include but are not limited to nitrites such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include β-butyro-lactone, γ-butyrolactone, γ-valerolactone and δ-valerolactone. Examples of the chain carbonates include dimethyl carbonate, diethyl carbonate, dipropyl carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropane. Cyclic ethers can have from 3 to 8 carbon atoms. Example cyclic ethers include tetrahydofuran, 2-methyl-tetrahydrofuran, 1,3-dioxolan, 1,2-dioxolan, 2-methyldioxolan and 4-methyldioxolan.

As examples, an assembled EDLC can comprise an organic liquid electrolyte such as tetraethylammonium tetrafluoroborate (TEA-TFB) or triethylmethylammonium tetrafluoroborate (TEMA-TFB) dissolved in an aprotic solvent such as acetonitrile.

With ionic salts such as tetraethylammonium tetrafluoroborate, the tetraethylammonium cation is larger than the tetraflouroborate anion. Without wishing to be bound by theory, the size of the (Et)$_4$N$^+$ cation is estimated be about 0.68 nm, while the size of the BF$_4^-$ anion is estimated to be about 0.48 nm.

Conventional approaches to the design of carbon-based electrodes typically involve maximizing the internal volume of the carbon material, which maximizes the achievable energy density. Specifically, these approaches lead to a predominance of smaller pores which yield a higher surface area per unit volume and thus a higher capacitance. Smaller pores, however, may inhibit the access and adsorption of larger ions. Further, aging-associated deposition of decomposition products from the electrolyte may inhibit ion movement or cause ion trapping, which can yield to an undesired attenuation in the capacitance over time and/or cycling of the ultracapacitor.

According to various embodiments, an energy storage device comprises a positive electrode and a negative electrode each comprising a blend of a first activated carbon material and a second activated carbon material. In embodiments, each blended electrode comprises a physical mixture of a first activated carbon material and a second activated carbon material. The first activated carbon material has a pore size distribution different than the second activated carbon material and each of the first activated carbon material and the second activated carbon material have <0.15 cm$^3$/g combined pore volume of any pores having a size of >2 nm.

In related embodiments, the first activated carbon material comprises pores having a size of ≥1 nm, which provide a combined pore volume of >0.3 cm$^3$/g; pores having a size from >1 nm to ≥2 nm, which provide a combined pore volume of ≥0.05 cm$^3$/g; and <0.15 cm$^3$/g combined pore volume of any pores having a size of >2 nm; while the second activated carbon material comprises pores having a size of ≤1 nm, which provide a combined pore volume of ≤0.3 cm$^3$/g; pores having a size from >1 nm to ≤2 nm, which provide a combined pore volume of ≥0.05 cm$^3$/g; and <0.15 cm$^3$/g combined pore volume of any pores having a size of >2 nm. For the sake of clarity, activated carbon pore sizes may be any rational number within the recited range. Thus, pores having a size from >1 nm to ≤2 nm may include 1.01, 1.115, 1.6, 1.99 and 2.0 nm.

The positive electrode, in addition to including the first activated carbon material, includes up to an equal amount (e.g., wt. %) of the second activated carbon material. Likewise, the negative electrode, in addition to including the second activated carbon material, includes up to an equal amount of the first activated carbon material.

With respect to the activated carbon content, the positive electrode may include 50-75% first activated carbon and 25-50% second activated carbon, e.g., a ratio (wt. %/wt. %) of first activated carbon to second activated carbon in the positive electrode may be 50:50, 55:45, 60:40, 65:35, 70:30 or 75:25. The negative electrode may include 25-50 wt. % first activated carbon and 50-75 wt. % second activated carbon, e.g., a ratio (wt. %/wt. %) of first activated carbon to second activated carbon in the negative electrode may be 50:50, 45:55, 40:60, 35:65, 30:70 or 25:75.

The first and second activated carbon materials can comprise micro-, meso- and/or macroscale porosity. As defined herein, microscale pores have a pore size of 2 nm or less (and ultramicropores have a pore size of 1 nm or less). Mesoscale pores have a pore size ranging from 2 to 50 nm. Macroscale pores have a pore size greater than 50 nm. In an embodiment, the activated carbons, e.g., first and second activated carbons, comprise a majority of microscale pores. The term "microporous carbon" and variants thereof means an activated carbon having a majority (i.e., at least 50%) of microscale pores. Thus, a microporous, activated carbon material can comprise greater than 50, 55, 60, 65, 70, 75, 80, 85, 90 or 95% microporosity. Energy storage devices disclosed herein may include activated carbon that consists or consists essentially of microporous carbon.

The pore size distribution of the activated carbon may be characterized as having a unimodal, bimodal or multi-modal pore size distribution. The ultramicropores can comprise 0.2 cm$^3$/g or more (e.g., 0.2, 0.25, 0.3, 0.35 or 0.4 cm$^3$/g or more) of the total pore volume. Pores having a pore size (d) in the range of 1<d≤2 nm can comprise 0.05 cm$^3$/g or more (e.g., at least 0.1, 0.15, 0.2 or 0.25 cm$^3$/g) of the total pore volume. If present, any pores having a pore size greater than 2 nm, which may include mesopores and/or macropores, can comprise 0.15 cm$^3$/g or less (e.g., less than 0.1 or 0.05 cm$^3$/g) of the total pore volume.

According to embodiments, a carbon-based electrode for an EDLC comprises first and second activated carbon materials each having a total porosity greater than about 0.4 cm$^3$/g (e.g., greater than 0.4, 0.45, 0.5, 0.55, 0.6, 0.65 or 0.7 cm$^3$/g). In embodiments, the portion of the total pore volume resulting from micropores (d≤2 nm) can be about 90% or greater (e.g., at least 90, 92, 94, 96, 98 or 99%) and the portion of the total pore volume resulting from ultramicropores (d≤1 nm) can be about 40% or greater (e.g., at least 40, 45, 50, 55, 60, 65, 70, 75, 80, 85, 90 or 95%).

In example embodiments, a positive electrode comprises a first activated carbon material comprising pores having a size of ≤1 nm, which provide a combined pore volume of >0.3 cm$^3$/g, pores having a size of >1 nm to ≤2 nm, which provide a combined pore volume of ≥0.05 cm³/g, and <0.15 cm³/g combined pore volume of any pores having a size of >2 nm. A negative electrode includes a second activated carbon material comprising pores having a size of ≤1 nm, which provide a combined pore volume of ≤0.3 cm³/g, pores having a size of >1 nm to ≤2 nm, which provide a combined pore volume of ≥0.05 cm³/g, and <0.15 cm³/g combined pore volume of any pores having a size of >2 nm.

The first activated carbon may, for example, comprise pores having a size of ≤1 nm, which provide a combined pore volume of >0.3 to 0.5 cm³/g. Such activated carbon may have pores having a size of >1 nm to ≤2 nm, which provide a combined pore volume of ≥0.2 cm³/g (e.g., 0.2 to 0.3 cm³/g), and <0.1 or <0.05 cm³/g combined pore volume of any pores having a size of >2 nm.

The second activated carbon may, for example, comprise pores having a size of ≤1 nm, which provide a combined pore volume of 0.2 to 0.3 cm³/g. Such activated carbon may have pores having a size of >1 nm to ≤2 nm, which provide a combined pore volume of ≥0.2 cm³/g (e.g., 0.2 to 0.3 cm³/g), and <0.1 or <0.05 cm³/g combined pore volume of any pores having a size of >2 nm.

Figure 3:
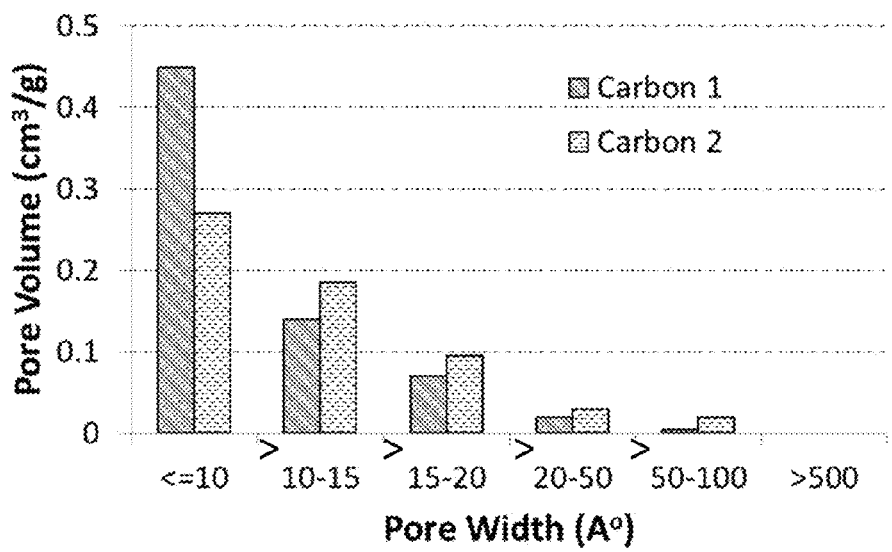
FIG. 3 is a pore size distribution histogram for example activated carbon materials.

A histogram of the respective pore size distributions for example first and second activated carbons is shown in FIG. 3. In the illustrated example, first activated carbon includes 0.45 cm³/g pore volume in pores less than ≤1 nm, 0.21 cm³/g pore volume in pores between >1 nm and ≤2 nm, and 0.02 cm³/g pore volume in pores >2 nm. The second activated carbon is characterized by 0.27 cm³/g pore volume in pores less than ≤1 nm range, 0.28 cm³/g pore volume in pores between >1 nm and ≤2 nm, and 0.05 cm³/g pore volume in pores >2 nm.

In embodiments, an EDLC comprises a first activated carbon having a combined pore volume associated with ultramicropores that is greater than the corresponding combined pore volume of ultramicropores in the second activated carbon. In embodiments, the first activated carbon may have a combined pore volume associated with pores having a size of >1 nm to ≤2 nm that is less than the corresponding combined pore volume of such size pores for the second activated carbon. In a still further example EDLC, the first activated carbon may have a combined pore volume associated with any pores having a size of >2 nm that is less than the combined pore volume of pores of such sized pores for the second activated carbon.

In the disclosed configurations, the carbon-based electrode that interacts with the smaller anion is engineered to comprise a greater proportion of ultramicropores, while the carbon-based electrode that interacts with the larger cation is engineered to have a larger average pore size. The blended carbon electrode assembly allows positive and negative ions to easily move in and out of the pores of the respective carbon electrodes, which minimizes capacitance fade while maintaining excellent performance.

In embodiments, the activated carbon can be characterized by a high surface area. A carbon-based electrode for an EDLC can include carbon having a specific surface area greater than about 300 m²/g, i.e., greater than 300, 350, 400, 500 or 1000 m²/g. Further, the activated carbon can have a specific surface area less than 2500 m²/g, i.e., less than 2500, 2000, 1500, 1200 or 1000 m²/g.

The activated carbon used to form the carbon-based electrodes can be derived from a variety of different carbon precursor materials. Example carbon precursor materials and associated methods of forming activated carbon are disclosed in commonly-owned U.S. patent application Ser. Nos. 12/335,044, 12/335,078, 12/788,478 and 12/970,073, the entire contents of which are hereby incorporated by reference.

In an example method, a carbon precursor material can be heated at a temperature effective to first carbonize the precursor material. Example carbonization temperatures are greater than about 450° C. (e.g., at least 450, 500, 550, 600, 650, 700, 750, 800, 850 or 900° C.). An inert or reducing atmosphere can be used during carbonization of the carbon precursor. Example gases and gas mixtures include one or more of hydrogen, nitrogen, ammonia, helium and argon. The carbonized material can be activated.

Physical or chemical activation processes may be used to produce activated carbon. In a physical activation process, raw material or carbonized material is exposed to typically oxidizing conditions (oxygen or steam) at elevated temperatures (e.g., greater than 250° C.). Chemical activation on the other hand involves impregnating raw or carbonized material with an activating agent, and then heating the impregnated carbon to a temperature typically in the range of 400-900° C. Chemical activating agents include alkali hydroxides or chlorides (e.g., NaOH, KOH, NaCl, KCl), phosphoric acid, or other suitable salts such as $CaCl_2$ or $ZnCl_2$.

In the various examples disclosed herein, a KOH-activated carbon derived from wheat flour was used to prepare the first activated carbon material and a commercially-available steam-activated carbon derived from coconut shells was used to prepare the second activated carbon material. Following chemical activation, the activated carbon can be washed to remove inorganic compounds and any chemical species derived from reactions involving the activating agent. Whether produced by steam or by chemical activation, the activated carbon can be dried and optionally ground to produce material comprising a substantially homogeneous distribution of porosity.

The performance (energy and power density) of an ultracapacitor depends largely on the properties of the activated carbon that makes up the electrodes. The activated carbon materials disclosed herein can be used to form carbon-based electrodes for economically viable, high power, high energy density devices. The properties of the activated carbon, in turn, can be gauged by evaluating the surface area, porosity and pore size distribution of the material, as well as by evaluating the electrical properties of a resulting ultracapacitor. Relevant electrical properties include the area-specific resistance, and the specific capacitance.

Whether the activated carbon material is predominately ultra-microporous or microporous, the presence of oxygen in the carbon, especially in the form of oxygen-containing surface functionalities, can adversely affect the properties of energy storage devices that comprise electrodes made from the activated carbon. For example, the presence of oxygen-containing surface functionalities can give rise to pseudo-capacitance, increase the self-discharge or leakage rate, cause decomposition of the electrolyte, and/or cause a long term increase in resistance and deterioration of capacitance. Oxygen functionalities can be introduced during the carbonization and activation steps, where the activating agent (e.g., steam or KOH) serves as an oxidation agent.

As a result of the potentially deleterious effects of incorporated oxygen, it can be advantageous to control and preferably minimize the oxygen content in activated carbon for use in energy storage devices such as EDLCs.

In embodiments, activated carbon whether formed by physical or chemical activation, is subjected to a refining step wherein the activated carbon is heated in an inert or reducing environment to a temperature ranging from, for example, about 450-1000° C., e.g., 900° C., and for a period of, for example, about 0.5-10 hours. Preferably, the environment during the refining step is substantially free of oxygen. The refining step reduces the oxygen content in the activated carbon. One method to reduce oxygen content is to refine (heat) the activated carbon in an inert environment (such as nitrogen, helium, argon, etc.) or in a reducing environment (such as hydrogen, forming gas, carbon monoxide, etc.). Example refining experiments were conducted in a retort furnace (CM Furnaces, Model 1212FL) purged with nitrogen.

In embodiments, the total oxygen content of the activated carbon is at most 1.5 wt. %. By total oxygen content is meant the sum of all atomic and molecular oxygen in the carbon, including oxygen in oxygen-containing functional groups in and/or on the carbon.

In embodiments, the total oxygen content of carbon black used to form carbon-based electrodes can be decreased in a parallel approach. For instance, prior to mixing activated carbon with carbon black and binder, the activated carbon and the carbon black can be heat-treated to decrease the oxygen content. Such heat-treatments of the activated carbon and the carbon black can be carried out separately, or in a unified process by mixing the activated carbon and the carbon black, and heating the mixture prior to combining the mixture with a binder. In embodiments, the total oxygen content of carbon black is at most 1.5 wt. %.

Once formed and optionally refined, the activated carbon can be incorporated into a carbon-based electrode. In a typical electric double layer capacitor (EDLC), a pair of carbon-based electrodes is separated by a porous separator and the electrode/separator/electrode stack is infiltrated with a liquid organic or inorganic electrolyte. The electrodes may comprise activated carbon that has been mixed with other additives (e.g., binders) and compacted into a carbon mat and laminated to a conductive metal current collector backing.

By way of example, a carbon mat having a thickness in the range of about 100-300 micrometers can be prepared by rolling and pressing a powder mixture comprising 60-90 wt. % activated carbon, 5-20 wt. % carbon black and 5-20 wt. % PTFE. The carbon black component of the carbon mat can be divided between a first activated carbon and a second activated carbon, where the proportion of first and second activated carbon depends on whether the carbon-based electrode will be formed into a positive electrode or a negative electrode. Carbon sheets can be stamped or otherwise patterned from the carbon mat and laminated to a conductive current collector to form a carbon-based electrode. The carbon-based electrode can be incorporated into an energy storage device.

According to an embodiment, an electrochemical cell comprises a positive electrode comprising a first activated carbon material and a second activated carbon material, a negative electrode comprising a first activated carbon material and a second activated carbon material, a porous separator, and a pair of electrically conductive current collectors, wherein the porous separator is disposed between the positive electrode and the negative electrode, and the positive and negative electrodes are each in electrical contact with a respective current collector. In embodiments, the first activated carbon represents at least 50% of the activated carbon content in the positive electrode, and the second activated carbon represents at least 50% of the activated carbon content in the negative electrode.

In addition to adjusting the pore size distribution, Applicants have found that the initial capacitance of an ultracapacitor comprising blended carbon-based electrodes can be increased by increasing the thickness of the negative electrode relative to the positive electrode. In embodiments, the negative electrode thickness can be 5, 10, 20, 30, 40, 50, 60, 70, 80, 90 or 100% greater than the positive electrode thickness.

EXAMPLES

The disclosure will be further clarified by the following examples.

Example 1

Comparative EDLCs were fabricated by incorporating only a second activated carbon material into each electrode. Particles of the second activated carbon were mixed with PTFE (DuPont 601A) and carbon black (Cabot BP2000) in the ratio (by weight) of 85:10:5 using a medium intensity Lab Master mixer at room temperature. Approximately 5% IPA by weight was added to the mixture to aid in fibrillation. The fibrillation process was conducted using a twin screw auger to obtain granules, which were then broken in a Fitz Mill to achieve a fine powder.

This powder mixture was calendared by passing it through a series of pressure rollers at 100° C. to form a 100 µm thick carbon mat. Two such carbon mats were laminated onto opposite sides of a conductive carbon ink-coated current collector to form a carbon-based electrode. The current collector was a 25 µm thick aluminum foil provided with a 5 µm thick coating of conductive carbon ink (DAG EB012 from Henkel, formerly Acheson).

Two of such electrodes, separated by porous separator paper TF4030 (Nippon Kodoshi Corporation) were wound into a jelly roll and packaged/sealed in an aluminum container. The assembled cell was vacuum dried at 130° C. for 48 h before being filled with a 1.2 M solution of TEA-TFB (tetraethyl ammonium tetrafluoroborate) electrolyte in acetonitrile.

Figure 4:
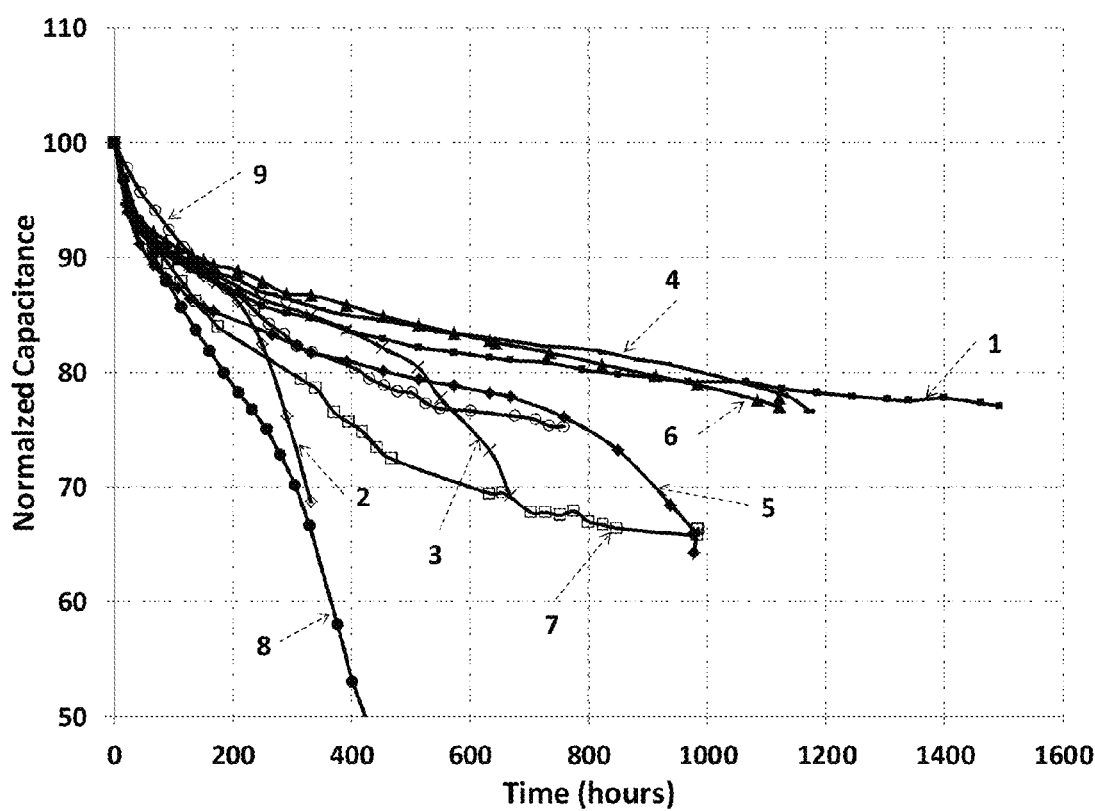
FIG. 4 is a plot of normalized capacitance versus time for various EDLC configurations.

The cell was heated and then subjected to constant voltage stress test at 2.7 V. The initial cell capacitance was 395 F, with a cell ESR of 1.74 mΩ. A plot of normalized capacitance as function of aging time is shown in FIG. 4. The time to 80% normalized capacitance was 910 hrs.

Example 2

A comparative cell was fabricated using the procedure of Example 1, except only a first activated carbon material was used to form the positive electrode and only a second activated carbon material was used to form the negative electrode.

The cell was heated and then subjected to constant voltage stress test at 2.7 V. The initial capacitance was 452 F. The cell ESR was 2.2 mΩ. A plot of normalized capacitance as function of aging time is shown in FIG. 4. The time to 80% normalized capacitance for the device was 260 hrs.

Figure 5:
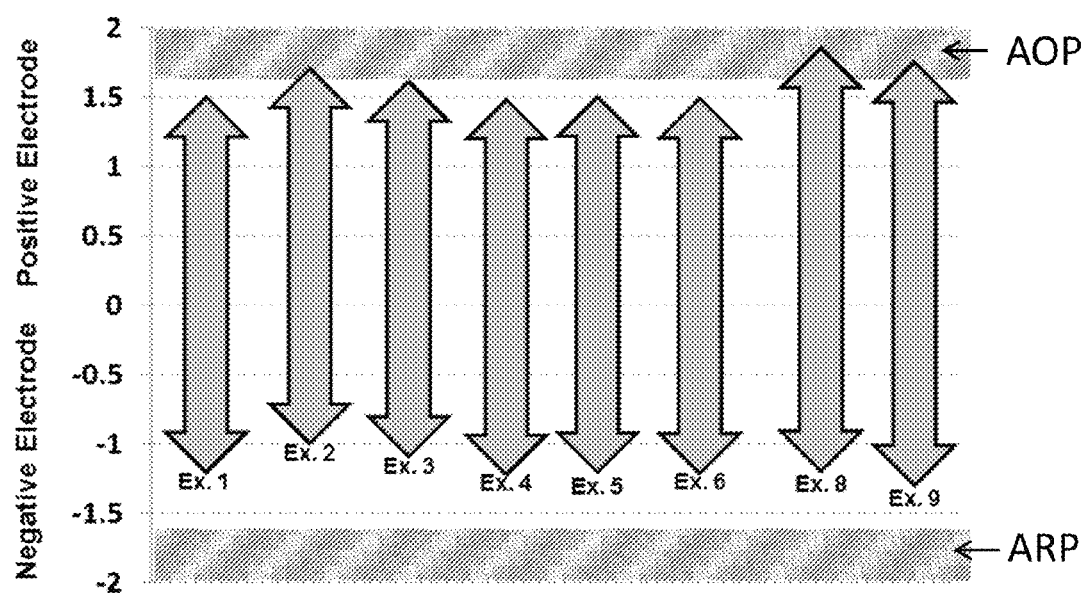
FIG. 5 is a series of polarization plots for various EDLC configurations.

Compared to Example 1, the tuned geometry of the instant example exhibits a slightly higher initial capacitance. However, while the initial capacitance fade is less for the tuned cell, without wishing to be bound by theory, the higher rate of capacitance degradation after about 200 h is believed to be due to the fact that in the current configuration, the TEA-TFB electrolyte unfavorably positions the electrode potentials outside the electrolyte voltage window into a decomposition region. Without wishing to be bound by theory, as summarized schematically in FIG. 5, which is a graphic showing the polarization potentials for differently-configured positive and negative electrodes, the positive electrode potential in the tuned cell is close to the acetonitrile oxidation potential (AOP) of about 1.7V or greater. Also shown is the acetonitrile reduction potential (ARP) of about −1.7V or less. The electrode potentials are plotted with reference to a normal hydrogen electrode (NHE).

Example 3

To address the high capacitive degradation associated with the tuned cell configuration of Example 2, an EDLC was fabricated using a blend of first and second activated carbon materials in each electrode. In the current example, the positive electrode was fabricated using a blend of 75% first activated carbon and 25% second activated carbon. The negative electrode was fabricated using a blend of 25% first activated carbon and 75% second activated carbon.

The cell was heated and then subjected to constant voltage stress test at 2.7 V. The initial capacitance for the cell was 454 F, with a cell ESR of 2.5 mΩ. As shown in the FIG. 4 plots of normalized capacitance versus time, the time to 80% normalized capacitance for the device was 510 hrs.

Compared to Example 2, the blended electrode design decreased the capacitance degradation by favorably moving the electrode potentials inside the electrolyte voltage window.

Example 4

A further EDLC was fabricated using blended electrodes. To simplify the manufacturing in the current example, each of the positive and negative electrodes was fabricated using a 50:50 blend of first and second activated carbon materials.

The cell was heated and then subjected to constant voltage stress test at 2.7 V. The initial capacitance for the cell was 456 F. The cell ESR was 2.2 mΩ. Referring to the FIG. 4 data, the time to 80% normalized capacitance for the device was 1000 hrs.

The capacitance is similar to that of the tuned cell configuration; however, the degradation of the blended electrode device is improved significantly due to favorable positioning of the electrode potentials inside the electrolyte voltage window, and a reduction of cation trapping.

Example 5

Further comparative EDLCs were fabricated by incorporating a first activated carbon material into each electrode using the process described in Example 1. Following the 2.7V stress test, the cell had an initial capacitance of 491 F, and an ESR of 3.4 mΩ. As shown in FIG. 4, the time to 80% normalized capacitance was 450 hrs.

Although the vast majority of open pores in the first activated carbon can contribute to the measured surface area, without wishing to be bound by theory, it is believed that not all the pores are electrochemically accessible. In the present example, rapid degradation of the capacitance was observed in the first 200 hours.

Example 6

The tuned cell configuration of Example 2 was repeated using a 1.2 M solution of TEMA-TFB (triethylmethyl ammonium tetrafluoroborate) in acetonitrile in place of the 1.2M TEA-TFB (tetraethyl ammonium tetrafluoroborate)-based electrolyte.

The cell was conditioned and then subjected to constant voltage stress test at 2.7 V. The initial capacitance was 472 F, and the cell ESR was 2.2 mΩ. The time to 80% normalized capacitance was 900 hrs. The substitution of TEMA-TFB for TEA-TFB improves the degradation behavior of the device, though TEMA-TFB is typically more expensive.

Example 7

A commercially-available EDLC (Maxwell—BCAP2000 P270 K04), which is a 2000 F rated 2.7 V device containing TEA-TFB electrolyte, was stress tested at 3.0 V and 65° C. The initial capacitance was 2118 F, and the ESR was 0.5 mΩ. The time to 80% normalized capacitance was 300 hrs.

Example 8

The configuration of Example 2 was repeated, and the cell was conditioned and then subjected to constant voltage stress test at 3.0 V. The initial capacitance was 2911 F, and the ESR was 0.66 mΩ. The time to 80% normalized capacitance was 185 hrs.

Example 9

The configuration of Example 6 was repeated, and the cell was conditioned and then subjected to constant voltage stress test at 3.0 V. The initial capacitance was 2867 F, and the ESR was 0.46 mΩ. The time to 80% normalized capacitance was 285 hrs. This example may be compared to Example 8. By comparing the time to 80% normalized capacitance, it is evident that TEMA-TFB electrolyte provides greater long-term stability than TEA-TFB in a tuned cell configuration.

Results from Example 1-9 are summarized in Table 1, where the first activated carbon is abbreviated C1 and the second activated carbon is abbreviated C2. In Table 1, Examples 1, 2 and 5-9 are comparative.

TABLE 1

Example EDLC configurations.

| Ex. | Pos. Electrode | Neg. Electrode | Electrolyte | Cap [F] | ESR [mΩ] | Time to 80% Cap [hr] |
|---|---|---|---|---|---|---|
| 1 | 100% C2 | 100% C2 | TEA-TBF | 395.2 | 1.7 | 910 (2.7 V) |
| 2 | 100% C1 | 100% C2 | TEA-TBF | 451.5 | 2.2 | 260 (2.7 V) |
| 3 | 75% C1 + 25% C2 | 25% C1 + 75% C2 | TEA-TBF | 454.4 | 2.5 | 510 (2.7 V) |
| 4 | 50% C1 + 50% C2 | 50% C1 + 50% C2 | TEA-TBF | 456.2 | 2.2 | 1000 (2.7 V) |
| 5 | 100% C1 | 100% C1 | TEA-TBF | 490.8 | 3.4 | 450 (2.7 V) |
| 6 | 100% C1 | 100% C2 | TEMA-TBF | 472.0 | 2.2 | 900 (2.7 V) |
| 7 | 100% C2 | 100% C2 | TEA-TBF | 2118.2 | 0.5 | 300 (3.0 V) |
| 8 | 100% C1 | 100% C2 | TEA-TBF | 2911.3 | 0.7 | 185 (3.0 V) |
| 9 | 100% C1 | 100% C2 | TEMA-TBF | 2866.7 | 0.5 | 285 (3.0 V) |

This disclosure provides electric double layer capacitors having positive and negative electrodes that each comprise a blend of first and second microporous activated carbon materials. The first and second activated carbon materials may be homogeneously mixed or provided as discrete layers in a composite electrode. Such structures provide high specific capacitance as well as improved long term stability. Methods for making such activated carbon materials are also disclosed.

As used herein, the singular forms "a," "an" and "the" include plural referents unless the context clearly dictates otherwise. Thus, for example, reference to a "carbon material" includes examples having two or more such "carbon materials" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a carbon mat that comprises activated carbon, carbon black and a binder include embodiments where a carbon mat consists activated carbon, carbon black and a binder and embodiments where a carbon mat consists essentially of activated carbon, carbon black and a binder.

It will be apparent to those skilled in the art that various modifications and variations can be made to the present invention without departing from the its spirit and scope. Since modifications, combinations, sub-combinations and variations of the disclosed embodiments incorporating the spirit and substance of the disclosure may occur to persons skilled in the art, the invention should be construed to include everything within the scope of the appended claims and their equivalents.

What is claimed is:

1. An energy storage device comprising:
a positive electrode and a negative electrode each comprising a first activated carbon material and a second activated carbon material; wherein
the activated carbon content in the positive electrode is 50-75 wt. % first activated carbon material and 25-50 wt. % second activated carbon material, and the activated carbon content in the negative electrode is 25-50 wt. % first activated carbon material and 50-75 wt. % second activated carbon material,
the first activated carbon material has a combined ultramicropore volume greater than the second activated carbon material, and
each of the first activated carbon material and the second activated carbon material have <0.15 $cm^3/g$ combined pore volume of any pores having a size of >2 nm.

2. The energy storage device according to claim 1, wherein
the first activated carbon material comprises pores having a size of ≤1 nm, which provide a combined pore volume of >0.3 $cm^3/g$; and
pores having a size from >1 nm to ≤2 nm, which provide a combined pore volume of ≥0.05 $cm^3/g$; and
the second activated carbon material comprises pores having a size of ≤1 nm, which provide a combined pore volume of ≤0.3 $cm^3/g$; and
pores having a size from >1 nm to ≤2 nm, which provide a combined pore volume of ≥0.05 $cm^3/g$.

3. The energy storage device according to claim 1, wherein the positive electrode and the negative electrode each comprise a mixture of the first activated carbon material, the second activated carbon material, a conductive carbon, and a binder.

4. The energy storage device according to claim 1, wherein the activated carbon content in each of the positive electrode and the negative electrode is 50 wt. % first activated carbon material and 50 wt. % second activated carbon material.

5. The energy storage device according to claim 1, wherein the first activated carbon material comprises pores having a size of ≤1 nm, which provide a combined pore volume of >0.3 to 0.5 $cm^3/g$, and the second activated carbon material comprises pores having a size of ≤1 nm, which provide a combined pore volume of 0.2 to 0.3 $cm^3/g$.

6. The energy storage device according to claim 1, wherein the first activated carbon material comprises pores having a size of >1 nm to ≤2 nm, which provide a combined pore volume of ≥0.2 $cm^3/g$; and the second activated carbon material comprises pores having a size of >1 nm to ≤2 nm, which provide a combined pore volume of ≥0.2 $cm^3/g$.

7. The energy storage device according to claim 5, wherein the combined pore volume of the pores having a size of >1 nm to ≤2 nm in the first activated carbon material is less than the combined pore volume of the pores having a size of >1 nm to ≤2 nm in the second activated carbon material.

8. The energy storage device according to claim 1, wherein the first activated carbon material comprises pores having a size of >2 nm, which provide a combined pore volume of <0.15 $cm^3/g$; and the second activated carbon material comprises pores having a size of >2 nm, which provide a combined pore volume of <0.15 $cm^3/g$.

9. The energy storage device according to claim 1, wherein the first activated carbon material comprises pores having a size of >2 nm, which provide a combined pore volume of <0.05 $cm^3/g$; and the second activated carbon material comprises pores having a size of >2 nm, which provide a combined pore volume of <0.05 $cm^3/g$.

10. The energy storage device according to claim 1, wherein a total pore volume of the first activated carbon material is greater than 0.5 $cm^3/g$ and a total pore volume of the second activated carbon material is greater than 0.5 $cm^3/g$.

11. The energy storage device according to claim 1, wherein the device is an ultracapacitor.

12. The energy storage device according to claim 1, further comprising an electrolyte solution of tetraethylammonium tetraflouroborate dissolved in an aprotic solvent.

13. A method of making an energy storage device comprising:
   forming a positive carbon-based electrode having a first activated carbon material and a second activated carbon material;
   forming a negative carbon-based electrode having the first activated carbon material and the second activated carbon material; and
   incorporating the positive and negative carbon-based electrodes into an energy storage device, wherein
   the first activated carbon material has a combined ultramicropore volume greater than the second activated carbon material and each of the first activated carbon material and the second activated carbon material have <0.15 cm$^3$/g combined pore volume of any pores having a size of >2 nm, and
   the activated carbon content in the positive electrode is 50-75 wt. % first activated carbon material and 25-50 wt. % second activated carbon material, and the activated carbon content in the negative electrode is 25-50 wt. % first activated carbon material and 50-75 wt. % second activated carbon material.

14. The method according to claim 13, wherein
   the first activated carbon material comprises pores having a size of 1 nm, which provide a combined pore volume of >0.3 cm$^3$/g; and
   pores having a size from >1 nm to ≤2 nm, which provide a combined pore volume of ≥0.05 cm$^3$/g; and
   the second activated carbon material comprises pores having a size of ≤1 nm, which provide a combined pore volume of ≤0.3 cm$^3$/g; and
   pores having a size from >1 nm to ≤2 nm, which provide a combined pore volume of ≥0.05 cm$^3$/g.

15. The method according to claim 13, wherein at least one of the first activated carbon material and the second activated carbon material are heated in an inert or reducing atmosphere prior to forming the positive and negative electrodes.

16. The energy storage device according to claim 1, wherein a weight ratio of the first activated carbon material to the second activated carbon material in the positive electrode ranges from 55:45 to 75:25 and a weight ratio of the first activated carbon material to the second activated carbon material in the negative electrode ranges from 25:75 to 45:55.

* * * * *